(12) United States Patent
Yoshizawa et al.

(10) Patent No.: US 7,198,446 B2
(45) Date of Patent: Apr. 3, 2007

(54) CONNECTED FASTENER HAVING SEPARATION FACILITATOR

(75) Inventors: Hideaki Yoshizawa, Tokyo (JP); Toshio Kimura, Tokyo (JP)

(73) Assignee: Max Kabushiki Kaisha, Chuo-Ku, Tokyo (JP)

( * ) Notice: Subject to any disclaimer, the term of this patent is extended or adjusted under 35 U.S.C. 154(b) by 0 days.

(21) Appl. No.: 10/491,006

(22) PCT Filed: Sep. 27, 2002

(86) PCT No.: PCT/JP02/10109

§ 371 (c)(1),
(2), (4) Date: Sep. 20, 2004

(87) PCT Pub. No.: WO03/029661

PCT Pub. Date: Apr. 10, 2003

(65) Prior Publication Data

US 2005/0031436 A1 Feb. 10, 2005

(30) Foreign Application Priority Data

Sep. 28, 2001 (JP) .............................. 2001-302287

(51) Int. Cl.
*F16B 15/08* (2006.01)
(52) U.S. Cl. ...................... 411/442; 206/344
(58) Field of Classification Search ............... 411/442, 411/443; 206/343–345
See application file for complete search history.

(56) References Cited

U.S. PATENT DOCUMENTS

| | | | | |
|---|---|---|---|---|
| 3,442,374 A | * | 5/1969 | Hillier .......................... | 206/344 |
| 3,471,008 A | * | 10/1969 | Cast et al. .................. | 206/344 |
| 3,756,391 A | * | 9/1973 | Keck et al. .................. | 206/343 |
| 3,851,759 A | * | 12/1974 | Young et al. ................ | 206/338 |
| 3,966,042 A | * | 6/1976 | Shelton et al. .............. | 206/344 |
| 4,343,579 A | * | 8/1982 | Shelton et al. .............. | 411/442 |
| 4,929,029 A | | 5/1990 | Deziel et al. | |
| 4,971,503 A | * | 11/1990 | Barnell et al. ............... | 411/443 |
| 5,005,699 A | * | 4/1991 | Kawashima et al. ......... | 206/344 |
| 5,733,085 A | * | 3/1998 | Shida et al. ................. | 411/442 |
| 6,029,814 A | * | 2/2000 | Ohuchi ........................ | 206/347 |
| 6,082,536 A | | 7/2000 | Ito et al. | |

FOREIGN PATENT DOCUMENTS

| | | |
|---|---|---|
| JP | 59-175707 | 11/1984 |
| JP | 63-292909 | 11/1988 |
| JP | 2-91164 | 7/1990 |
| JP | 4-119615 | 10/1992 |
| JP | 10-9235 | 1/1998 |
| JP | 2888320 | 2/1999 |
| JP | 11-216686 | 8/1999 |

* cited by examiner

*Primary Examiner*—Flemming Saether
(74) *Attorney, Agent, or Firm*—Buchanan Ingersoll & Rooney PC

(57) ABSTRACT

The object of the invention is to secure straight travelability for a fastener during the driving of the latter, simplify the connecting fastener production process, simplify the cleaning of the work site, and prevent work-attending damage to the flooring. In a connecting fastener, kraft paper (5) in a combination band (2, 3) for holding a number of nails (2) is pasted to opposite surfaces of the nails (2), the kraft paper (5) having a plastic layer (6) that is formed with a plurality of grooves (7A, 7B) with a pitch smaller than the arrangement pitch of the nails (2), facilitating the separation of the nails (2).

28 Claims, 13 Drawing Sheets

Fig. 1
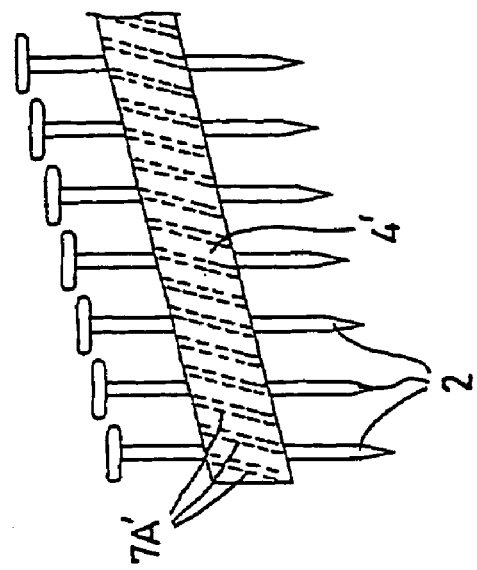
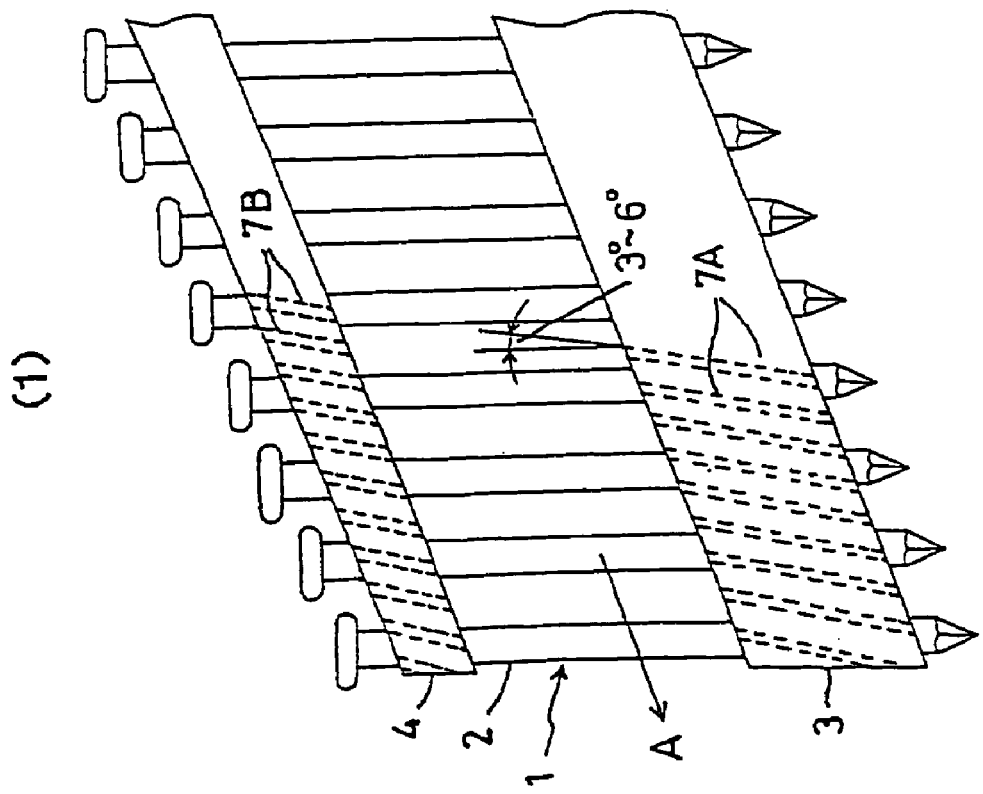

Fig. 9
(1)
(2)
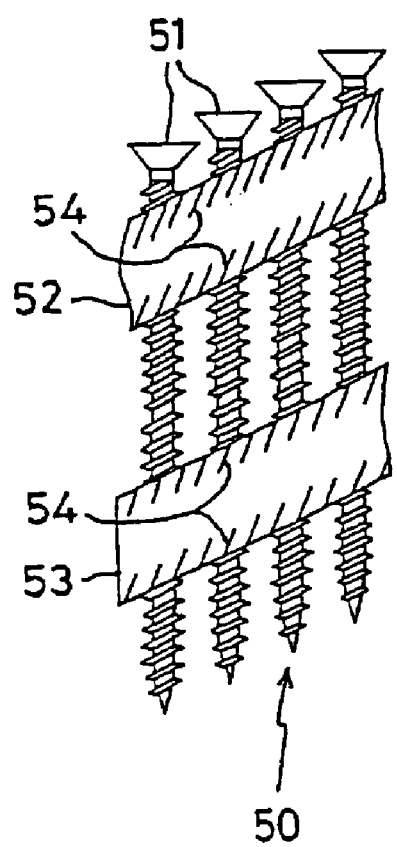
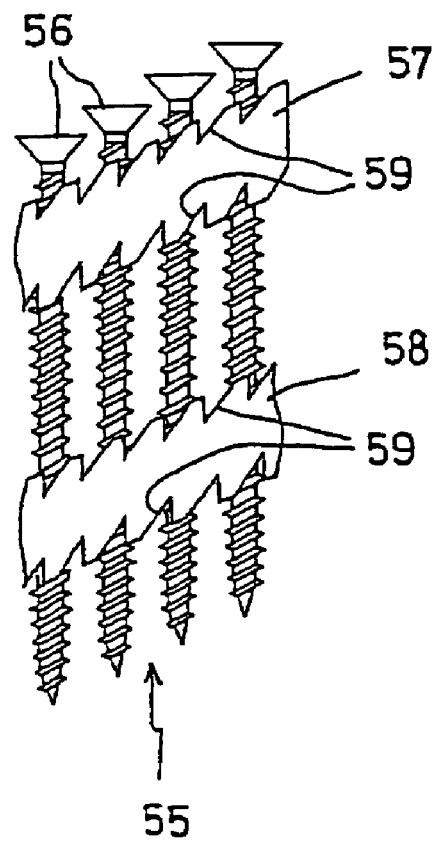

Fig. 12
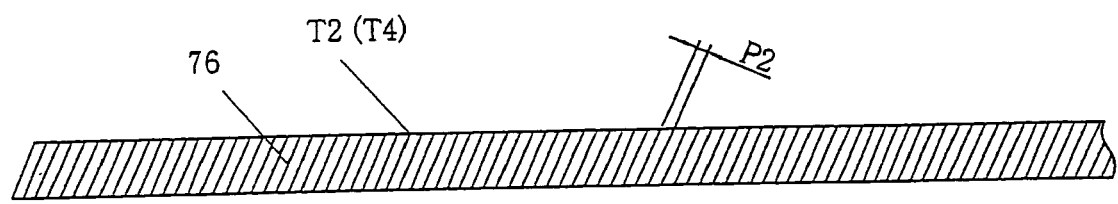
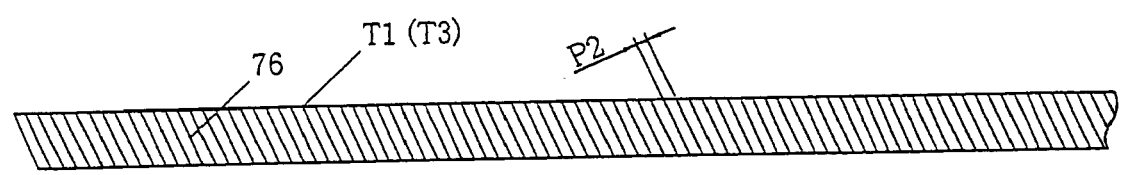
(a)
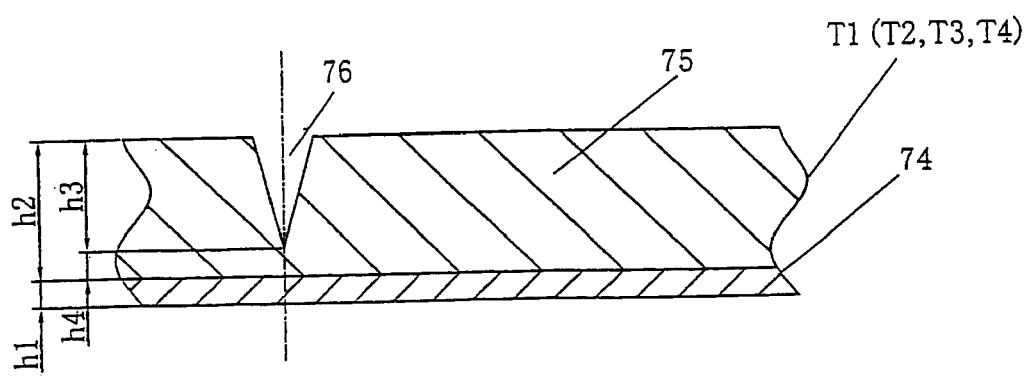
(b)

CONNECTED FASTENER HAVING SEPARATION FACILITATOR

FIELD OF THE INVENTION

The present invention relates to a connected fastener to be loaded in a fastener driving machine for driving a fastener such as a nail and a screw, and a combination band to be used for a connected fastener.

BACKGROUND OF THE INVENTION

Conventionally, as a technology of a connected fastener to be loaded in a fastener driving machine, a wire connected nail disclosed in the official gazette of the Japanese Utility Model Application Laid Open No. 4-119615, and a paper connected type nail disclosed in the official gazette of the Japanese Patent Application Laid Open (JP-A) No. 11-216686 are known. The above-mentioned wire connected nail comprises a large number of nails arranged in parallel and connected with a wire, with the nails integrated and adhered with each other by the wire, and a notch provided to the wire part between the nails.

Moreover, a connected nail disclosed in the official gazette of the Japanese Utility Model Application Laid Open No. 59-175707, with a supporting part supported at the upper and lower parts of a nail, a thick part and a thin part provided to the supporting part, and the thin part provided with the vulnerability, is known.

Moreover, a paper connected type nail disclosed in the official gazette of the Japanese Patent Application Laid Open (JP-A) No. 11-216686, comprising a large number of nails arranged in parallel and interposed between a pair of papers, and perforations formed in the paper parts between the nails, is known. Additionally, the official gazette of the U.S. Pat. No. 2,888,320 is known.

However, in the case of the wire connected nail of the official gazette of the Japanese Utility Model Application Laid open No. 4-119615, if the nail is driven by a fastener driving machine, the wire part is scattered and spread over the work floor surface so that the worker steps on the wire and slips, the work floor surface is damaged, tainted, and the attention is required for cleaning the spread wire scattered pieces after the work.

Moreover, according to the connected nail of the official gazette of the Japanese Utility Model Application Laid Open No. 59-175707 for supporting the nails with the supporting part with each other, in the case the nail is driven by the fastener driving machine to a flooring, or the like, if the supporting part supporting the lower part of the nail can hardly be cut, the nail lower part becomes inclined by being pulled by the supporting part at the time the impact of the driver of the fastener driving machine is applied, so that a problem arises in that the nail is driven obliquely.

Although the paper connected type nail of the official gazette of the Japanese Patent Application Laid Open (JP-A) No. 11-216686 has a purpose of preventing the nail inclination of the connected nail of the official gazette of the Japanese Utility Model Application Laid Open No. 59-175707, which is proposed by the present applicant, it was revealed that the extra labor and time are needed in the production if the perforations are formed accurately in the papers between the nails after interposing the nails between the papers in the case of forming the perforations in the papers the nails with each other.

The connected fastener according to the present invention has been achieved in view of the circumstances, and an object thereof is to secure straight movement of a fastener such as a nail and a screw at the time of driving the fastener, simplify the production process of the connected fastener, simplify the cleaning of the work site, and prevent work-attending damage to the flooring.

SUMMARY

According to a preferred embodiment of the invention, a connected fastener comprises a plurality of fasteners supported in parallel with an arrangement pitch by a combination band; wherein the combination band is made either of a paper or a resin having an adhesive layer; wherein the adhesive layer of the combination band is bonded to at least one surface of the fasteners at least at any of an upper part, a middle part or a lower part of the fasteners that are disposed in parallel; wherein the combination band is provided with a plurality of separation facilitators for facilitating separation of the fasteners, the separation facilitators extend from an upper part of a subsequent fastener toward a lower part of a preceding fastener, and the separation facilitators are formed with a distance between each pair of adjacent separation facilitators that is smaller than the arrangement pitch of the fasteners; wherein each of the separation facilitators is selected from the group consisting of:

a slit, a thin part, or perforations formed in the adhesive layer;

a v-shaped notch formed in an upper end rim part of the combination band and has a forward side extending coaxially with the fastener and a backward side having an inclination angle of 3 to 6 degrees with respect to an axial direction of the fastener;

a vulnerable part formed as a linear thin part across an entirety of the width direction of the adhesive layer, the width direction extending substantially in the longitudinal direction of the fasteners; and a vulnerable part formed as a linear thin part of the adhesive layer, at a position between the shafts of the fasteners disposed in parallel at equal intervals.

According to another embodiment of the invention, a connected fastener comprises a plurality of fasteners each having a shaft of a predetermined length and a head part to be hit mounted on an upper end of the shaft, the fasteners are disposed in parallel at equal intervals and formed into a flat shape by connecting the shafts of the arranged fasteners with a combination band; wherein the combination band is a tape member made of a base member comprising a paper or a material which does not melt at a predetermined temperature, having a predetermined width and one surface provided with an adhesive layer which functions as a bond at the predetermined temperature; wherein the fasteners are bonded to the combination band at a predetermined position on a lower side of the shaft below a center of the shaft in the longitudinal direction, or the fasteners are bonded at both the predetermined position on the lower side and at a vicinity of the upper end part; wherein the adhesive layer of the combination band is provided with at least a vulnerable part formed as a linear thin part, at a position between the shafts of the fasteners disposed in parallel at equal intervals, inclining at a direction from an upper part of a subsequent fastener toward a lower part of a preceding fastener, wherein in the thin parts there is a layer of adhesive that is thinner than a thickness of the adhesive layer in remaining parts of the adhesive layer.

According to another embodiment of the invention, a combination band for connecting a plurality of fasteners having a shaft of a predetermined length and a head to be hit mounted on the upper end of the shaft so that the plurality of fasteners form a flat shape is provided. The combination band has a base material formed into a tape having a predetermined width extending substantially in the longitudinal direction of the fasteners and made of a paper or a flexible material which does not melt at a predetermined temperature; wherein the base material is provided with an adhesive layer on one side having a bonding function at the predetermined temperature; wherein the adhesive layer is provided with a vulnerable part formed as a plurality of linear thin parts across an entirety of the width direction, wherein in the thin parts there is a layer of adhesive that is thinner than a thickness of the adhesive layer in remaining parts of the adhesive layer.

According to another embodiment of the invention, a connected fastener comprises a plurality of fasteners supported in parallel with an arrangement pitch by a combination band; wherein the combination band is made either of a paper or a resin having an adhesive layer; wherein the adhesive layer of the combination band is bonded to at least one surface of the fasteners at least at any of an upper part, a middle part or a lower part of the fasteners that are disposed in parallel; wherein the combination band is provided with a plurality of means for facilitating separation of the fasteners, the separation facilitating means extend from an upper part of a subsequent fastener toward a lower part of a preceding fastener, and the separation facilitators are formed with a distance between each pair of adjacent separation facilitating means that is smaller than the arrangement pitch of the fasteners.

BRIEF DESCRIPTION OF THE DRAWINGS

FIG. 1(1) is a partial enlarged view of a connected fastener according to a first embodiment of the present invention. FIG. 1(2) is a modified embodiment of the connected fastener of (1).

FIGS. 5(2), (3) are modified embodiments of FIG. 5(1).

FIG. 7(2) is a partial enlarged view of a connected fastener according to a fourth embodiment.

FIG. 8(2) is a partial enlarged view of a connected fastener according to a sixth embodiment.

FIG. 9(1) is a partial enlarged view of a connected fastener according to a seventh embodiment. FIG. 9(2) is a partial enlarged view of a connected fastener according to an eighth embodiment.

FIG. 12 is an explanatory diagram of a combination band used for the connected fastener according to the ninth embodiment of the present invention.

DETAILED DESCRIPTION OF THE PREFERRED EMBODIMENTS

Figure 2:
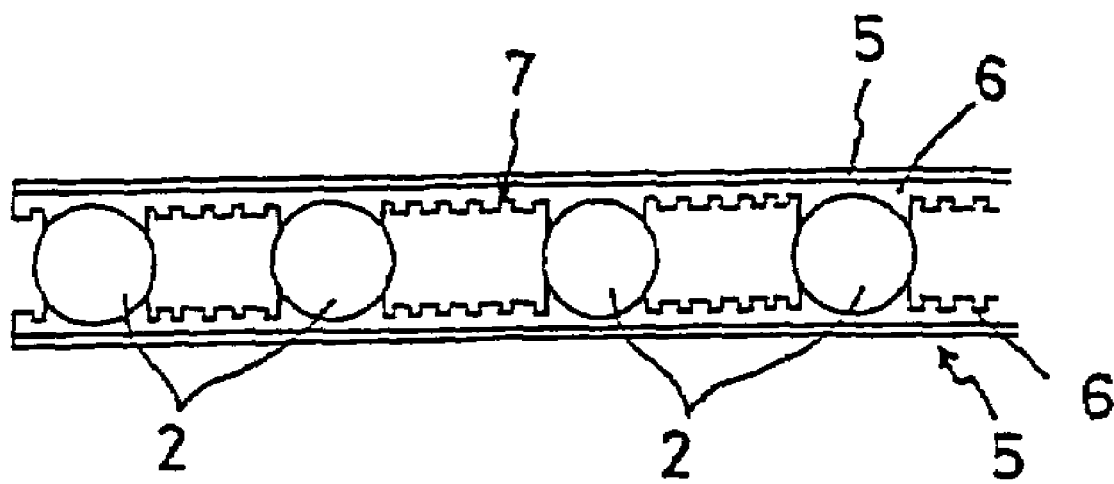
FIG. 2 is a partial view showing the planar shape of the connected fastener of FIG. 1.

Hereinafter, the connected fasteners according to the embodiments of the present invention will be explained with reference to the drawings. The fasteners described below are explained as the ones including a nail and a screw.

FIG. 1(1) is a partial enlarged view of a connected nail as a connected fastener according to a first embodiment of the present invention. The connected nail 1 is a connected nail formed like a plate. The connected nail 1 is supported and loaded in the body part of a fastener driving machine 8 as a fastener driving machine shown in FIG. 3 so as to be sent out in the arrow A direction toward the lower part of a driver 9.

The above-mentioned connected nail 1 is formed by arranging a plurality of fasteners (a nail 22, a screw 51, or the like to be described later) in a row at equal intervals, and binding the fasteners integrally by a combination band 4 to be described later. Moreover, the fasteners comprise a shaft part (shank) to be driven into a lumber or the like (so-called work), and a flange-like head part on the upper end part of the shank which has a diameter larger than the shaft diameter of the above-mentioned shank to be hit by the tip end of the driver 9 of the fastener driving machine 8. Moreover, the tip end as the lower end of the shank is sharpened.

As an optimum example, the connected nail 1 according to this embodiment has a structure with a pair of combination bands 3, 3 bonded to the lower part of the nail 2 (shank lower part), and the combination bands 4, 4 bonded to the upper part of the nail 2 (shank upper part). Moreover, the upper and lower combination bands 3, 4 are provided at the substantially same position (common position) by setting the shank head part as the reference even when the other connected nails having different shank lengths are used for the same fastener driving machine 8. This is because the supporting position for the connected nail in the fastener driving machine 8 is based on the head position. That is, this is for supporting the posture at the time of moving the connected nail by contacting the combination band with a predetermined position in the loading part (magazine), or engaging a fastener supplying feeding nail, or the like (not shown) with the part in the shank where the combination band is not provided.

As shown in FIG. 2, the combination bands 3, 3 and the combination bands 4, 4 have a plastic layer 6 with an adhesive property such as a high density polyethylene (HDPE) formed as the adhesive layer on a craft paper 5.

The above-mentioned adhesive layer is formed by heating and melting a hot melt type adhesive, applying the same on a paper connected material such as a craft paper 5, and cooling down the same to an ordinary temperature so as to be in a solid state. The hot melt type adhesive is made of a thermoplastic resin (plastic) such as a high density polyethylene (HDPE).

The hot melt type adhesive can be provided by using a terpene resin, an asphalt, a rosin and a derivative thereof, a polyvinyl acetate, an ethylene vinyl acetate copolymer, a polyamide, a phenoxy resin, an ethyl cellulose, a polyisobutylene, a petroleum resin, a polyester, or the like alone or as a mixture. From the aspect of the connected fastener supporting strength, a high density polyethylene (HDPE) is preferable.

In the plastic layers 6 formed on the surface of the craft paper 5 of the connecting bands 3 and the connecting bands 4, narrow width grooves 7A, 7B as a separation facilitating means are formed in parallel by a pitch shorter than the arrangement positions of the nails 2, 2. The grooves 7A, 7B elongate from the lower part of the preceding side nail 2 to the upper part of the subsequent side nail 2, with an inclination of 3 to 6 degrees provided with respect to the axial direction of the nail 2.

Figure 3:
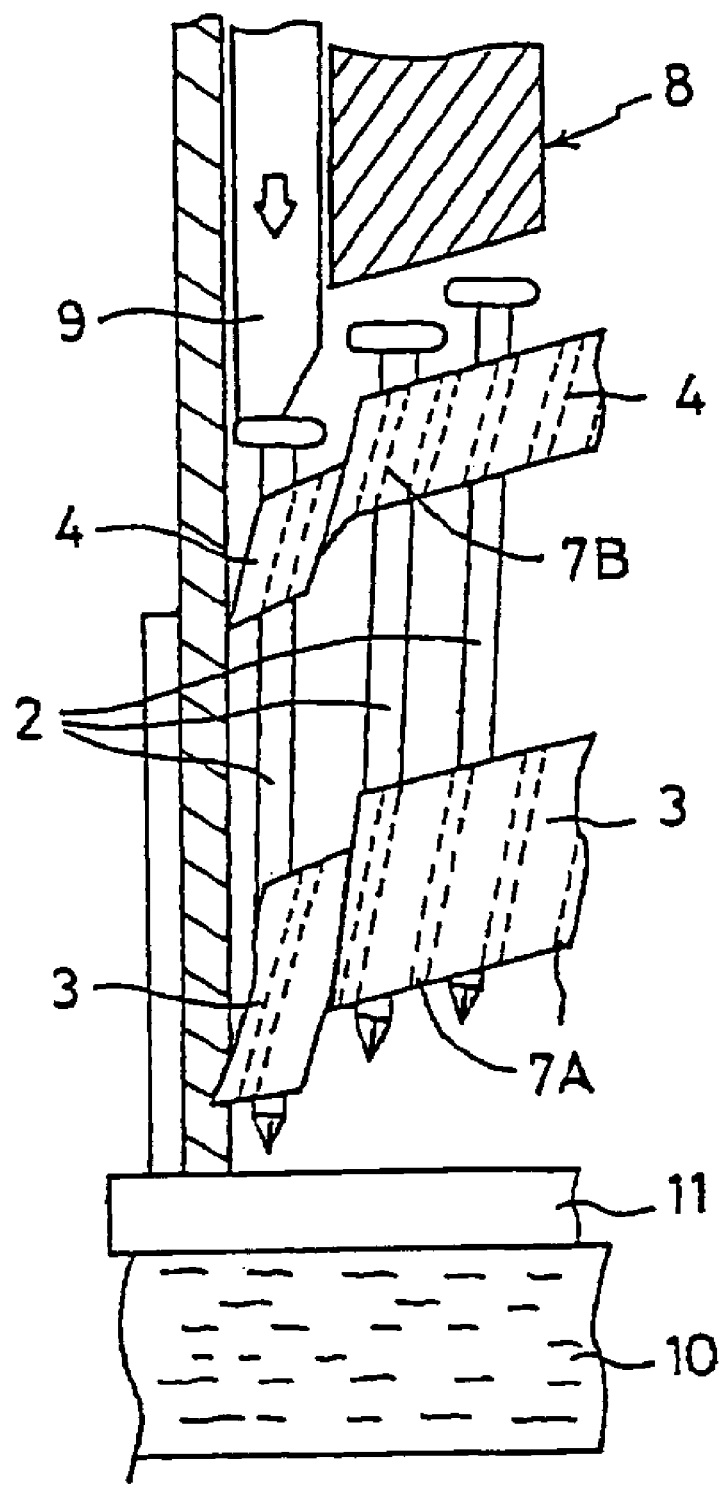
FIG. 3 is an explanatory diagram of the nail behavior at the time of driving the connected fastener according to FIG. 1 by a fastener driving machine.

As shown in FIG. 3, in the case the connected nail 1 is loaded in the fastener driving machine 8, it is forced frontward from the rear side (in the direction toward the left side in FIG. 3) so as to be sent out to the lower part of the drive 9 to be the ejection path and wait to be hit. By pulling a trigger of the fastener driving machine 8, which is not shown, the driver 9 is lowered so that the nail 2 is pushed out by the driver 9 so as to drive the top end part of the nail 2 into joint materials 10, 11.

As mentioned above, since the grooves 7A, 7B are formed in the combination bands 3, 4 and the grooves 7A, 7B are inclined rearward by an angle of 3 to 6 degrees with respect to the shaft of the nail 2, in particular the lower part of the combination band 3 is cut so as to be displaced to the oblique front side at the time of driving the nail 2. Thereby, since inclination of the lower end part of the nail 2 to the right side of FIG. 2 can be prevented, the straight forward movement of the nail is improved so that the driving operation can be executed substantially vertically with respect to the joint-materials 10, 11.

Moreover, since the plastic layer 6 is fixed integrally with the craft paper 5, the plastic layer 6 is made of a polyethylene, and the polyethylene is flexible, it can hardly be scattered so that there is no risk of slip of the worker at the time of work, the floor surface cleaning can be facilitated, and the floor surface can hardly be damaged even in the case the worker steps on that.

As another embodiment shown in FIG. 1(2), a combination band 3 may be adhered to the substantially middle part of the nails 2, 2. In the plastic layer 6 as the adhesive layer of the combination band 3', grooves 7A' having a narrow width as a separation facilitating means are formed in parallel by a pitch shorter than the arrangement pitch of the nails 2,2. The grooves 7A' elongate from the lower part of the preceding side nail 2 to the upper part of the subsequent side nail 2, with an inclination of 3 to 6 degrees provided with respect to the axial direction of the nails 2.

Figure 4:
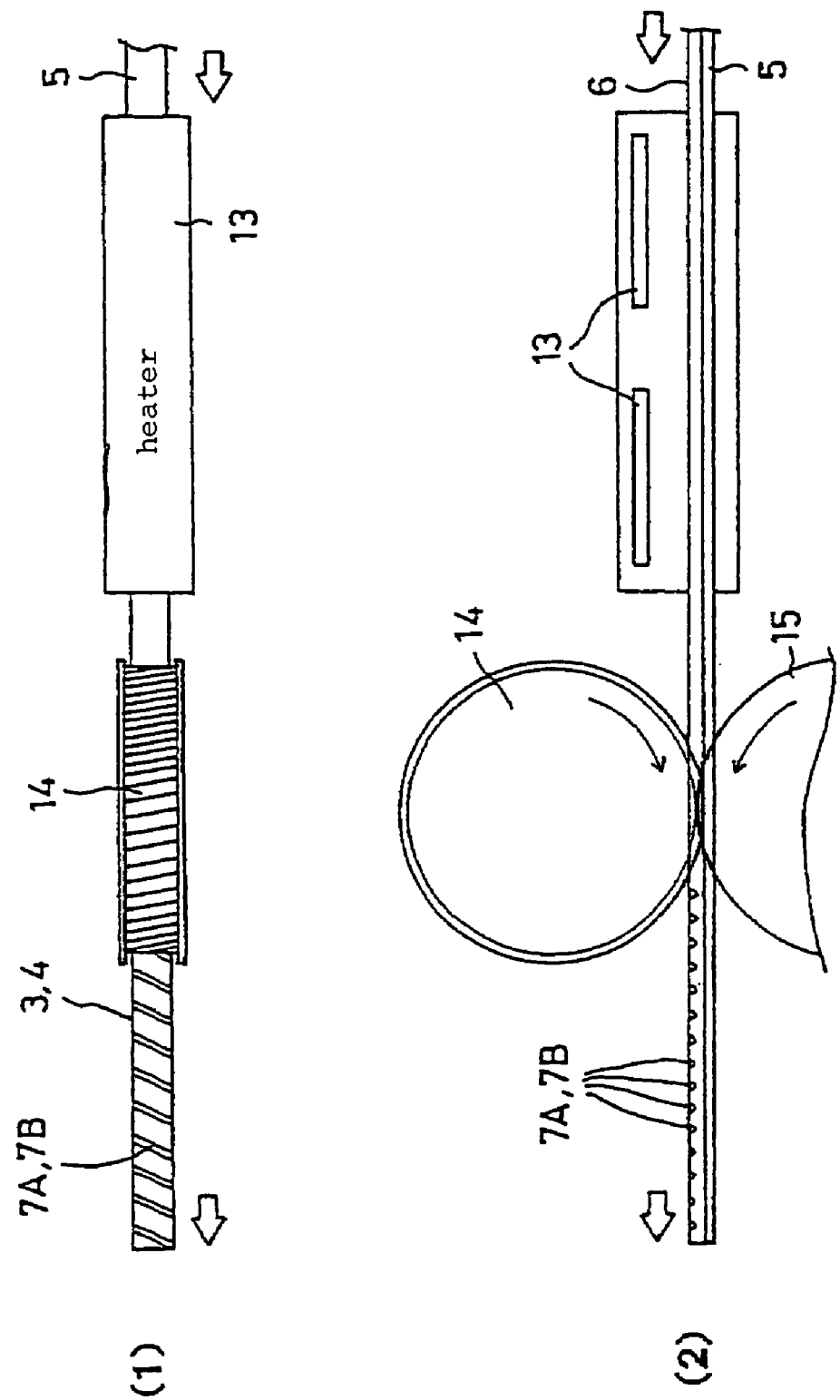
FIG. 4 is a schematic diagram showing the production process of a combination band to be used for the connecting fastener of FIG. 1.

FIG. 4 shows the shaping process of the combination bands 3, 4. The combination bands 3, 4 to be shaped have a plastic layer 6 formed preliminarily on a craft paper 5 formed like a band. The plastic layer 6 is softened by heating with a heater 13, and then the draft paper 5 is sent out between a groove molding 14 and a supporting roller 15. The groove molding 14 comprising a gear-like shape forms the grooves 7A, 7B in the softened plastic layer 6 of the craft paper 5. The combination bands 3, 4 with the grooves 7A, 7B formed are sent to a disposing process for arranging the nails 2 in parallel so as to be attached on the right and left side surfaces of the nails 2. Of course, in order to attach the combination bands 3, 4 on the both side surfaces of the nails 2 at the same time, a pair of the craft papers 5 are provided for the combination band 3 and the combination band 4. While the plastic layer 6 is in a softened state and the nails 2 are heated by the heating means, a pair of the craft papers 5 are attached on the both side surfaces of the nails 2 and cut by a predetermined length. As to the shaping method, another method can be used as well, and thus it is not limited to this method.

Figure 5:
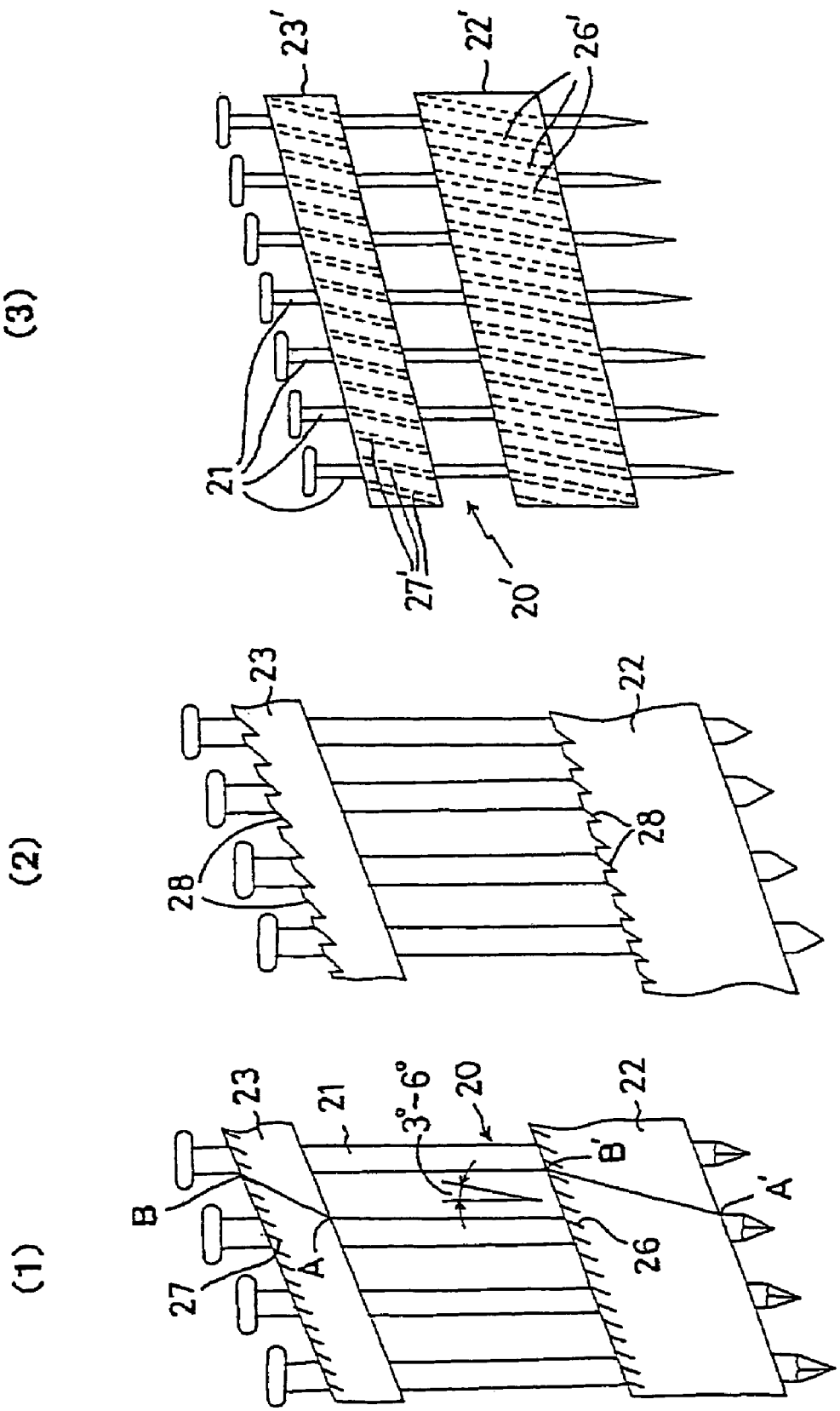
FIG. 5(1) is a partial enlarged view of a connected fastener according to a second embodiment.
Figure 6:
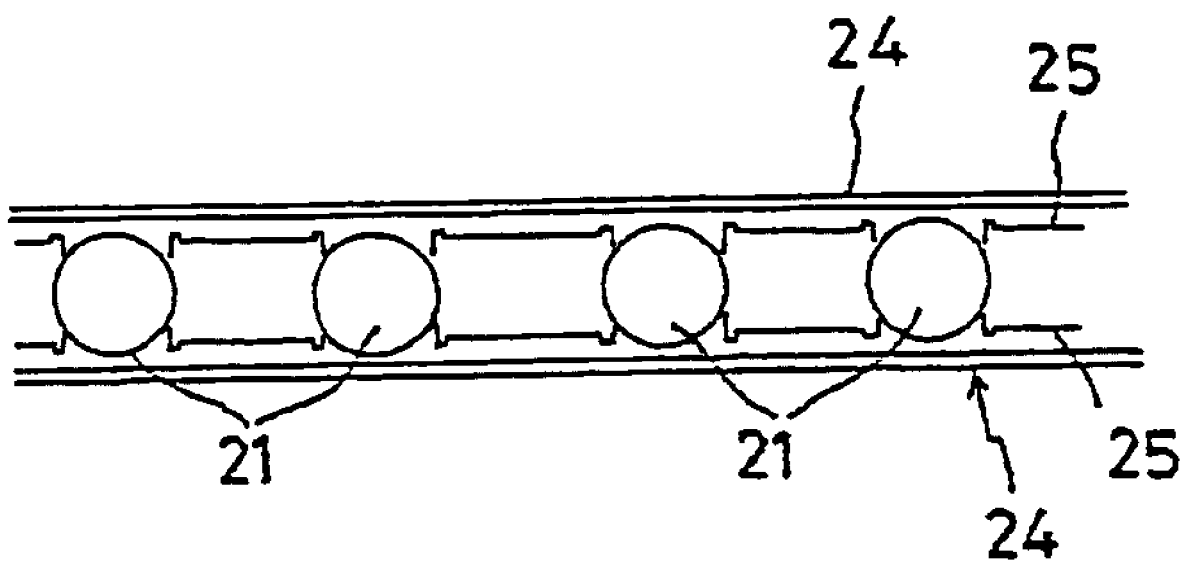
FIG. 6 is a partial view showing the planar shape of the connected fastener of FIG. 5.

FIG. 5(1), FIG. 6 are partial enlarged views of a connected nail according to a second embodiment of the present invention. The connected nails 20 shown in FIG. 5(1) and FIG. 6 have the substantially same configuration as the connected nails 1 shown in FIG. 1 and a plastic layer 25 is formed on the inner side of a craft paper 24 of the combination bands 22, 23 for supporting the nails 21. The nails 21 are supported between the plastic layers 25

Notches 26, 27 elongating in the oblique direction are formed in the upper end rim part of the craft paper 24 by a pitch shorter than the arrangement pitch of the nails 21. The inclination of the notches 26, 27 has an inclination substantially from 3 degrees to 6 degrees with respect to the nails 21 so as to be cut along the notches 26, 27 at the time the head parts of the nails 21 are hit by the above-mentioned driver 9.

The connected nails shown in FIG. 5(2) have substantially V-shaped notches 28 formed by a pitch shorter than the arrangement pitch of the nails 21 in place of the notches 26, 27. The orientation of the notches 28 inclines in the same orientation as the above-mentioned notches 26, 27. Since they are same as the connecting nails 20 of FIG. 5(1) in the other configuration, the explanation can be incorporated.

Although the craft paper was used as the base material for configuring the combination bands 3, 4, or the like as the optimum example in the above-mentioned embodiment, a plastic film or sheet with the tearing easiness in the width direction improved may be used as well. In the case of using such a synthetic resin material, the melting temperature should be higher than that of the above-mentioned adhesive layer to be melted at a predetermined temperature.

FIG. 5(3) shows another embodiment of the connected nails. The connected nails 20' shown in FIG. 5(3) has the substantially same configuration as the connected nails 1 shown in FIG. 1, and the plastic layer 25 is formed on the inner side surface of the craft paper 24 of the combination bands 22', 23' for supporting the nails 21. The nails 21 are supported between the plastic layers 25, 25.

Then, in this embodiment, unlike the above-mentioned connected nails 1, perforations 26', 27' as the separation facilitating means are formed in the craft paper 24 by a pitch shorter than the arrangement pitch of the nails 21. The perforations 26', 27' have an inclination substantially from 3 degrees to 6 degrees with respect to the nails 21 so as to be cut along the perforations 26', 27' at the time the head parts of the nails 21 are hit by the above-mentioned driver 9.

Figure 7:
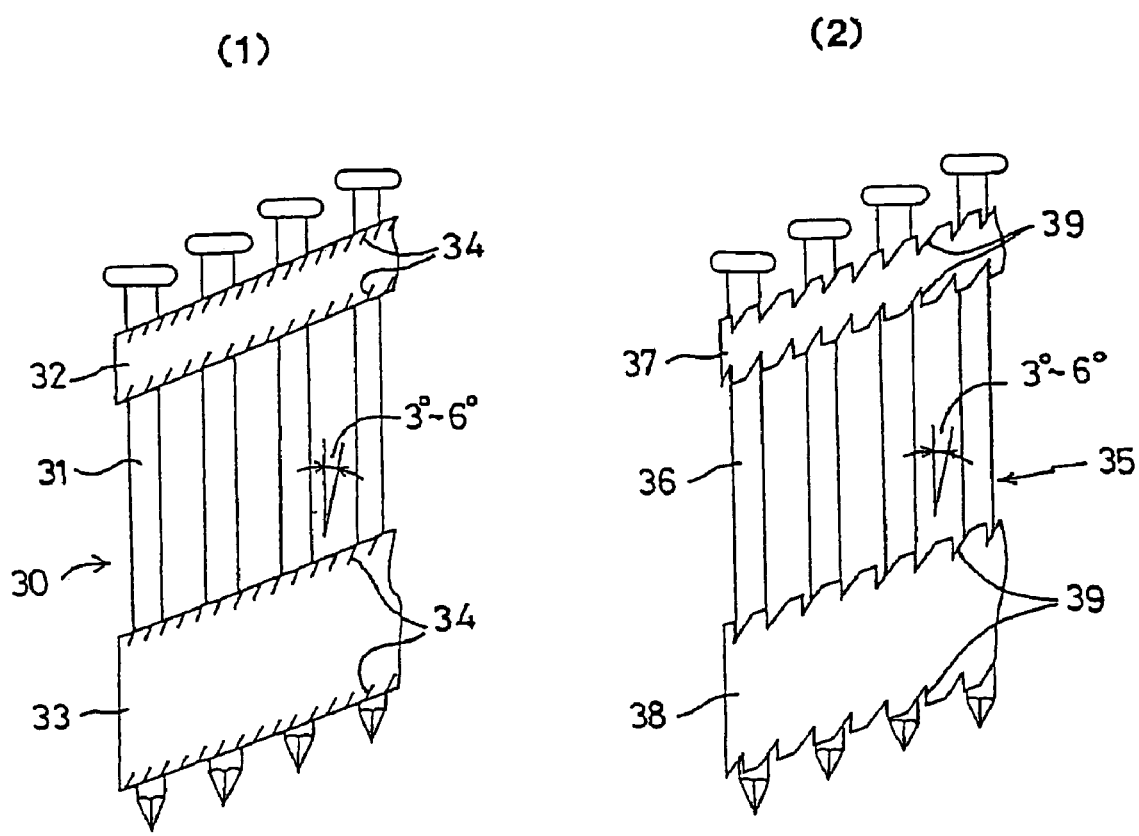
FIG. 7(1) is a partial enlarged view of a connected fastener according to a third embodiment.

FIG. 7(1) shows a connected nail 30 of a third embodiment of the present invention. The connected nail 30 has a structure such that a pair of right and left combination bands 32, 33 are adhered on the both sides at the upper part and the lower part of nails 31. As in the case of the connected nail shown in FIG. 6, those using a craft paper as the base material provided with a plastic (HDPE) are used for the combination bands 32, 33. Then, in this embodiment, a notch 34 having an inclination angle of 3 to 6 degrees with respect to the axial direction of the nail 31 is formed each in the upper and lower end rim parts of the combination bands 32, 33 of the upper part and the lower part.

FIG. 7(2) shows a connected nail 35 of a fourth embodiment of the present invention. The connecting nail 35 has a structure such that a pair of right and left combination bands 37, 38 are adhered on the both sides at the upper part and the lower part of a nail 36. As in the case of the connected nail shown in FIG. 6, those using a craft paper as the base material provided with a plastic (HDPE) are used for the combination bands 37, 38. Then, a V-shaped notch 39 having an inclination angle of 3 to 6 degrees with respect to the axial direction of the nail 36 is formed each in the upper and lower end rim parts of the combination bands 37, 38 of the upper part and the lower part. As shown in FIG. 7(2), one side for forming the V-shaped notch 39 elongates in the same axial direction as the nail 36, and the other side for forming the notch 39 has an inclination angle of 3 to 6 degrees with respect to the axial direction of the nail 36.

Figure 8:
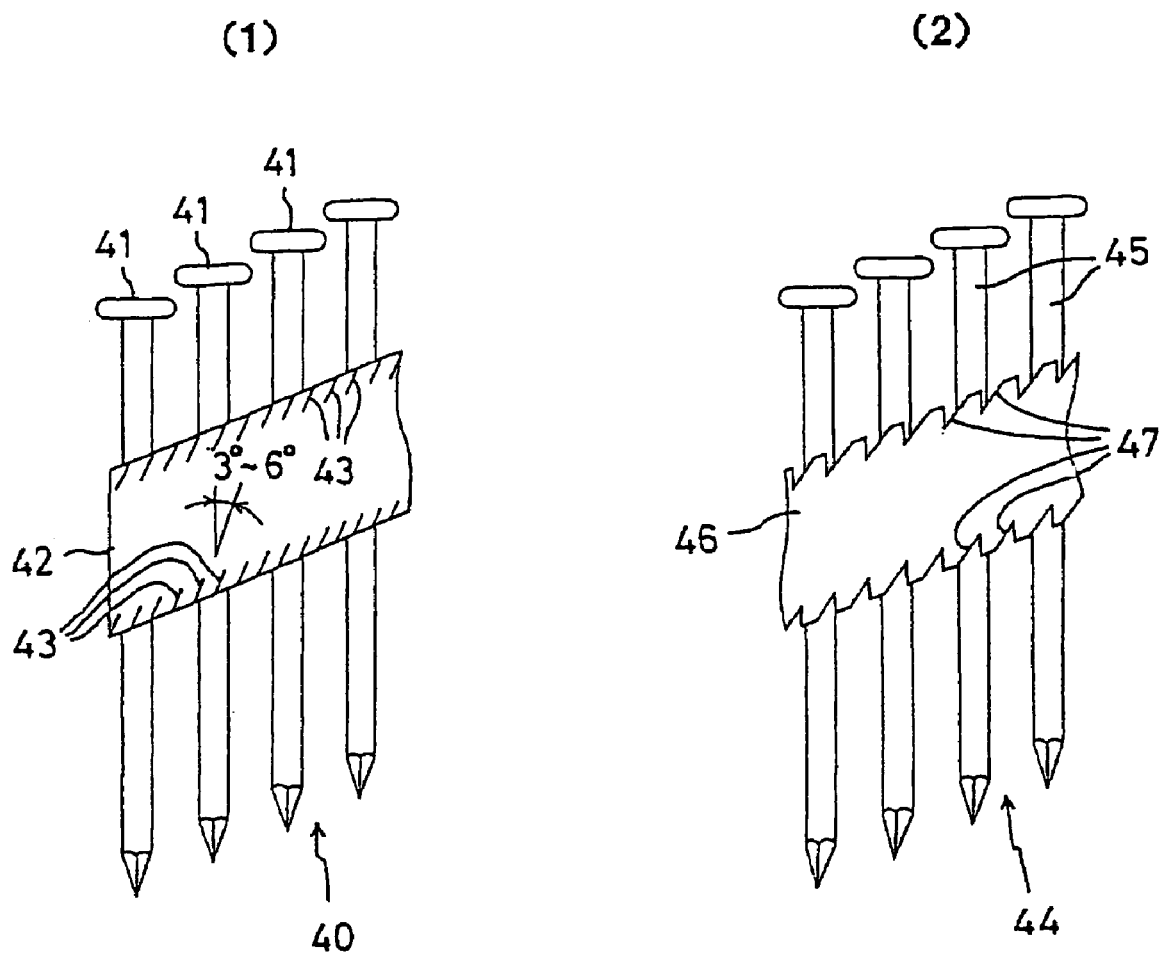
FIG. 8(1) is a partial enlarged view of a connected fastener according to a fifth embodiment.

FIG. 8(1) shows a connected nail 40 of a fifth embodiment of the present invention.

The connected nail 40 has a structure such that a pair of right and left combination bands 42 are adhered on the both sides of the substantially middle part of a nail 41. As in the case of the connected nail shown in FIG. 6, those using a craft paper as the base material provided with a plastic (HDPE) are used for the combination bands 42. Then, a notch 43 having an inclination angle of 3 to 6 degrees with respect to the axial direction of the nail 41 is formed in the upper and lower end rim parts of the combination bands 42.

FIG. 8(2) shows a connected nail 44 of a sixth embodiment of the present invention. The connected nail 44 has a structure such that a pair of right and left combination bands 46 are adhered on the both sides of the substantially middle part of a nail 45. As in the case of the connected nail shown in FIG. 6, those using a craft paper as the base material provided with a plastic (HDPE) are used for the combination bands 46. Then, a V-shaped notch 47 having an inclination angle of 3 to 6 degrees with respect to the axial direction of the nail 46 is formed each in the upper and lower end rim parts of the combination bands 46. As shown in FIG. 8(2), one side for forming the V-shaped notch 47 elongates in the same axial direction as the nail 41, and the other side for forming the notch 47 has an inclination angle of 3 to 6 degrees with respect to the axial direction of the nail 41.

FIG. 9(1) shows a connected screw 50 of a seventh embodiment of the present invention. The connected screw 50 has a structure such that a pair of right and left combination bands 52, 53 are adhered on the both sides of the upper part and the lower part of a screw 51 as the fastener. As in the case of the connected nail shown in FIG. 6, those using a craft paper as the base material provided with a plastic (HDPE) are used for the combination bands 52, 53. Then, a notch 54 having an inclination angle of 3 to 6 degrees with respect to the axial direction of the screw 51 is formed in the upper and lower end rim parts of the combination bands 52, 53 of the upper part and the lower part.

FIG. 9(2) shows a connected screw 55 of an eighth embodiment of the present invention. The connected screw 55 has a structure such that a pair of right and left combination bands 57, 58 are adhered on the both sides of the upper part and the lower part of a screw 56. As in the case of the connected nail shown in FIG. 6, those using a craft paper as the base material provided with a plastic (HDPE) are used for the combination bands 57, 58. Then, a V-shaped notch 59 having an inclination angle of 3 to 6 degrees with respect to the axial direction of the screw 56 is formed each in the upper and lower end rim parts of the combination bands 57, 58 of the upper part and the lower part. As shown in FIG. 9(2), one side for forming the V-shaped notch 59 elongates in the same axial direction as the screw 56, and the other side for forming the notch 59 has an inclination angle of 3 to 6 degrees with respect to the axial direction of the screw 56.

In the above-mentioned embodiment, as shown in FIG. 5(1), the separation facilitating means between the preceding and subsequent nails 21 in the combination band 23 (22) may be formed with the line AB (A'B') linking the intersection portion A (A') of the preceding side fastener and the lower end part of the combination band with the intersection portion B (B') of the subsequent side fastener and the upper end part of the combination band, as the maximum inclination angle.

Figure 10:
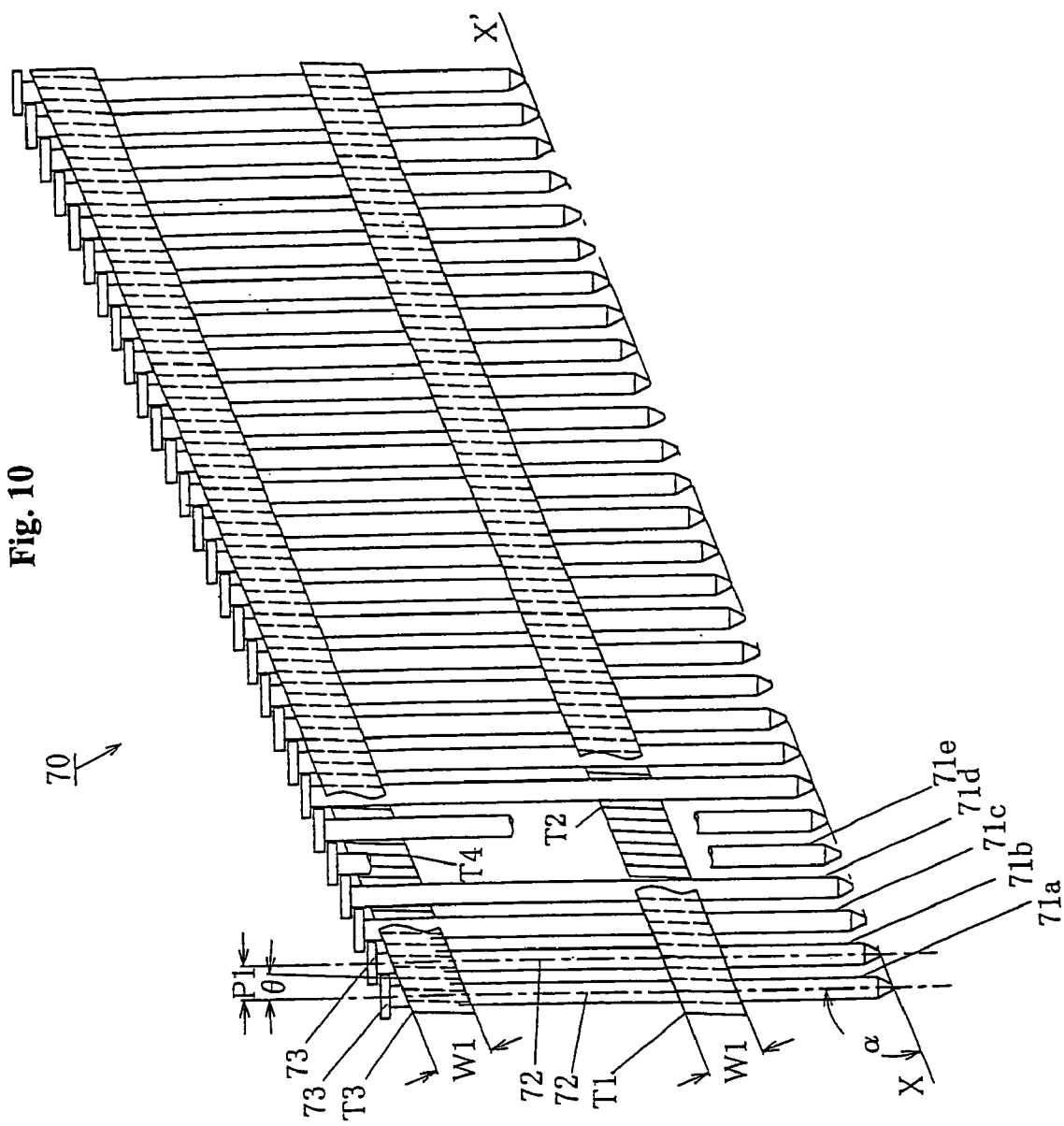
FIG. 10 is a side view of a connected fastener according to a ninth embodiment of the present invention.
Figure 11:
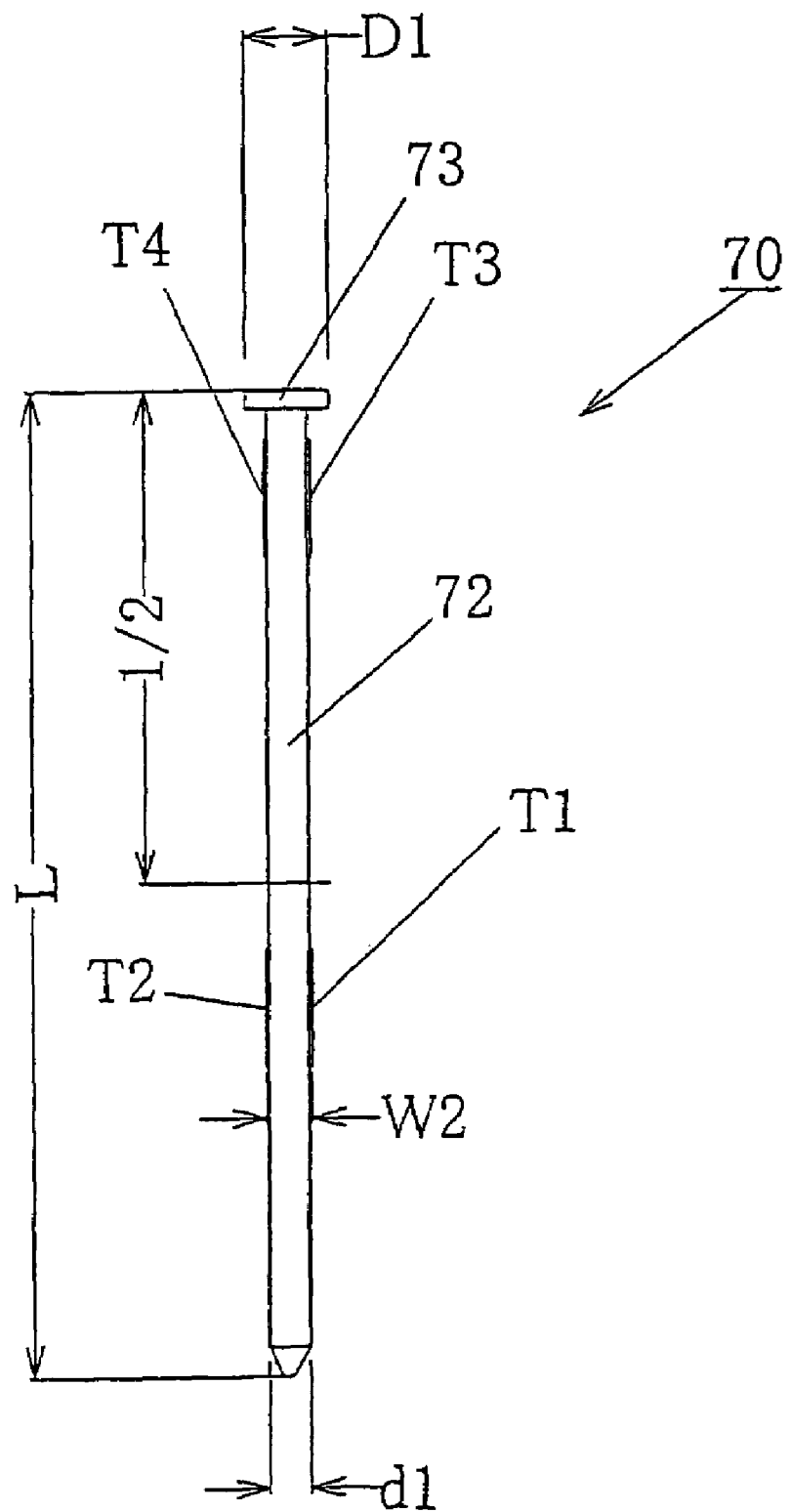
FIG. 11 is an essential part plan view of a connected fastener shown in FIG. 10.

Next, a ninth embodiment of a connected fastener, or the like according to the present invention will be explained with reference to the drawings. FIG. 10 is a right side view of the connected fastener 70 according to this embodiment, with the connected fastener 70 partially notched for explaining the structure. FIG. 11 is a plan view of the connected fastener showing only the top fastener 71a out of a plurality of connected fasteners.

As shown in FIG. 10, the connected fastener 70 has a configuration where a plurality of fasteners 71 (71a, 71b, 71c, 71d, ... ) are disposed such that the shanks 72 are in parallel to each other and the head parts 73 are displaced not to be contacted with each other in order to be disposed with equal intervals, and the fasteners are connected with each other by combination bands T1, T2 and combination bands T3, T4.

In the case of this embodiment, the combination bands T1, T2, T3, T4 are formed like a tape with about a 10 mm width, and as in the above-mentioned other embodiments, an adhesive layer 75 of a hot melt type adhesive is provided on the surface of a craft paper (base material 74) (FIG. 12(b)). One combination bands T1, T2 according to the configuration are adhered on a predetermined position in the lower half part of the shank, and the other combination bands T3, T4 are adhered on the upper part of the shank. Moreover, the combination bands T1 and T3 are provided on the right side surface of the connected fastener 70, and the combination bands T2 and T4 are provided on the left side surface of the connecting fastener 70.

A fastener 71 used for the connecting fastener 70 shown in the figure has a shank with a total length L1 of about 90 mm and a shaft diameter d1 of about 3.7 mm, and around flange-like head part having a diameter D1 of about 7.6 mm provided on the upper end of the shank. While displacing upward the head parts of fasteners 71 which interfere with each other by setting the interval between the fasteners to about 6 mm, the fasteners 71 are connected via the above-mentioned combination bands T1, T2, T3, T4. The fasteners to be combined as the connecting fastener are not limited to those of the above-mentioned standard (size). However, those of the other standard may be used as well. In this case, the conditions for the connecting fastener and the combination band to be explained below should be applied with optional modification.

As a result of providing the connecting fastener 70 in the above-mentioned configuration, the angle formed by the straight line X–X' linking the same positions (for example, the tip end positions) of the fastener in the preceding position and the fastener in the subsequent position and the shank is about 111 degrees.

Then, the above-mentioned combination bands are adhered on the both sides of the arranged fasteners 71 by the same angle as the above-mentioned angle. The combination bands T1 and T2 are adhered in the positional relationship where the front and rear sides are facing at a position of about 2 mm lower from the head part 73, and the combination bands T3, T4 are adhered in the positional relationship where the front and rear sides are facing at a position on the lower side with respect to the substantially half of the total length.

The connecting fastener 70 formed accordingly is a kind of a structure having the rigidity to the extent where the fastener 71 is not separated easily or the connecting fastener 70 is not bent by the rupture of the combination band when dropping the same from a relatively high point or handling the same in transportation, loading the same, or the like.

In the adhesive layer 75 of the above-mentioned combination bands T1, T2, T3, T4, a linear vulnerable part 76 is formed in a plurality at equal intervals as a separation facilitating means as in the above-mentioned other embodiments. FIG. 12 is a diagram for explaining the structure of the combination band. FIG. 12(a) is a side view showing the state of the combination band viewed from the adhesive layer 75 side, and FIG. 12(b) is an enlarged partial cross sectional view of the combination band of the portion provided with the vulnerable part 76. Although the four combination bands are used in this embodiment, the combination bands T1 and T3, and the combination bands T2 and T4 are each same things, and the combination bands to be used are of two kinds. They differ in terms of the angle of the vulnerable part 76. The vulnerable part 76 is provided so as to have the same angle with respect to the shank 72 in the case of facing the adhesive layer 75. In this embodiment, it is provided such that the angle with respect to the shank becomes about an inclination angle of 3 degrees (114 degrees with respect to the above-mentioned line X–X').

The combination band will further be explained with reference to FIG. 12. FIG. 12(b) is an enlarged partial cross sectional view showing the vulnerable part 76. As the optimum embodiment, as shown in the same figure, the vulnerable part 76 is a notch having a V-shaped cross section. That is, a thin part of the notch is formed with respect to the adhesive layer 75, and the thin part is provided as the rupture part. A plurality of the V-shaped notches are formed in parallel so as to have the angle. of about 3 degrees with respect to the above-mentioned shank and the interval (pitch) P2 of about 2 mm.

Moreover, as mentioned above, the combination bands T1 to T4 have the width W1 of 10 mm, the thickness h1 of the base material 74 of about 0.2 mm, and the thickness h2 of the adhesive layer of about 0.3 mm. Furthermore, the depth h of the notch is about 0.1 mm (0.07 to 0.15 mm), and as a result, the thickness h4 of the thin part is about 0.2 mm (0.23 to 0.15 mm).

The specific sizes and the conditions concerning the above-mentioned combination bands T1 to T4 are found out as a result of the various kinds of the experiments so as to satisfy the functions to be explained below. That is, as the main conditions required for the combination bands, largely the following four kinds thereof can be presented.

First, it has the strength not to have the fastener 71 separated or dropped off easily at the time of handling the connecting fastener 70 nor to have the fastener 71 broken by the rupture of the combination band, and the connecting fastener 70 has the rigidity not to be deformed extremely by the external force.

This function is influenced mainly by the materials of the above-mentioned base material 74 and the adhesive layer 75, and the width W1 and the thickness h2 of the adhesive layer. With the larger width W1 and thickness h2, the strength and the rigidity are made higher, and with the smaller ones, the strength and the rigidity are made lower.

Second, it has a function of preventing the turning of the fastener 71 hit by the driver 9 in the fastener driving machine 8 so as to prevent the inclination of the fastener 71 at the time of the ejection.

This function is influenced mainly by the materials of the base material 74 and the adhesive layer 75, the angle of the vulnerable part 76, the depth h3 of the notch (the thickness h4 of the thin part), and the pitch P2 of the vulnerable part 76. That is, the rupture strength of the vulnerable part 76 when the fastener 71 is hit is determined to some extent by the thickness h4 of the thin part. If it can easily be ruptured, the inclination of the fastener 71 can be reduced, however, in the case it can be ruptured extremely easily, the strength and the rigidity as the above-mentioned connecting fastener 70 are made lower. Moreover, the angle of the vulnerable part 76 is necessary for moving the fastener 71 to be turned to the direction opposite to the turning. The pitch P2 will be explained below.

Third, it is the function of supplying the fastener 71 into the ejection path. According to the fastener driving machine 8, the fastener being positioned at several subsequent pieces from the top position fastener 71a to be hit, or the final part fastener is pressed forward by the pressuring means, and thereby the top position fastener is supplied into the ejection path. That is, the pressuring force by the pressuring means is transmitted by the combination bands T1 to T4 so that the top position fastener 71a is pushed into the ejection path. That is, the top position fastener 71a is pressed against the front side part in the ejection path by the combination bands T1 to T4. As in the case of the first function, this function is influenced mainly by the width W1, the thickness h2, or the like of the adhesive layer.

Fourth, it is the function of supporting the fasteners 71 bound as the connecting fastener 70 so as to be driven by the same condition, and driving all the fasteners vertically with respect to the work without bending the same. The same condition denotes that the influence posed by the combination band to the fasteners 71 is same, and specifically it denotes that they are necessarily separated by the vulnerable part 76 at the time of ejecting the fasteners 71.

This function is influenced mainly by the width W1, the angle, and the pitch P2 of the adhesive layer, and in particular, the pitch P2 is important. That is, in the case the fastener and the adhesive layer are adhered, in the adhesive layer, a portion to be adhered with the fastener and a part not to be melted are generated alternately. Then, in order to provide the part not to be melted, that is, provide the vulnerable part 76 having at least one line by the above-mentioned angle between the arranged fasteners, the pitch P2 is an important element. This is because the function of the vulnerable part 76 cannot be provided in the case the vulnerable part 76 is melted even if it is formed preliminarily in the combination band, and at least one linear vulnerable part 76 to be functioned normally is necessary between the fasteners even in the case the melted part is generated.

The above-mentioned is the structure and the function of the connecting fastener and the combination band according to the ninth embodiment. Next, the state of ejecting the connecting fastener 70 by the fastener driving machine 8 will be explained with reference to FIG. 13.

Figure 13:
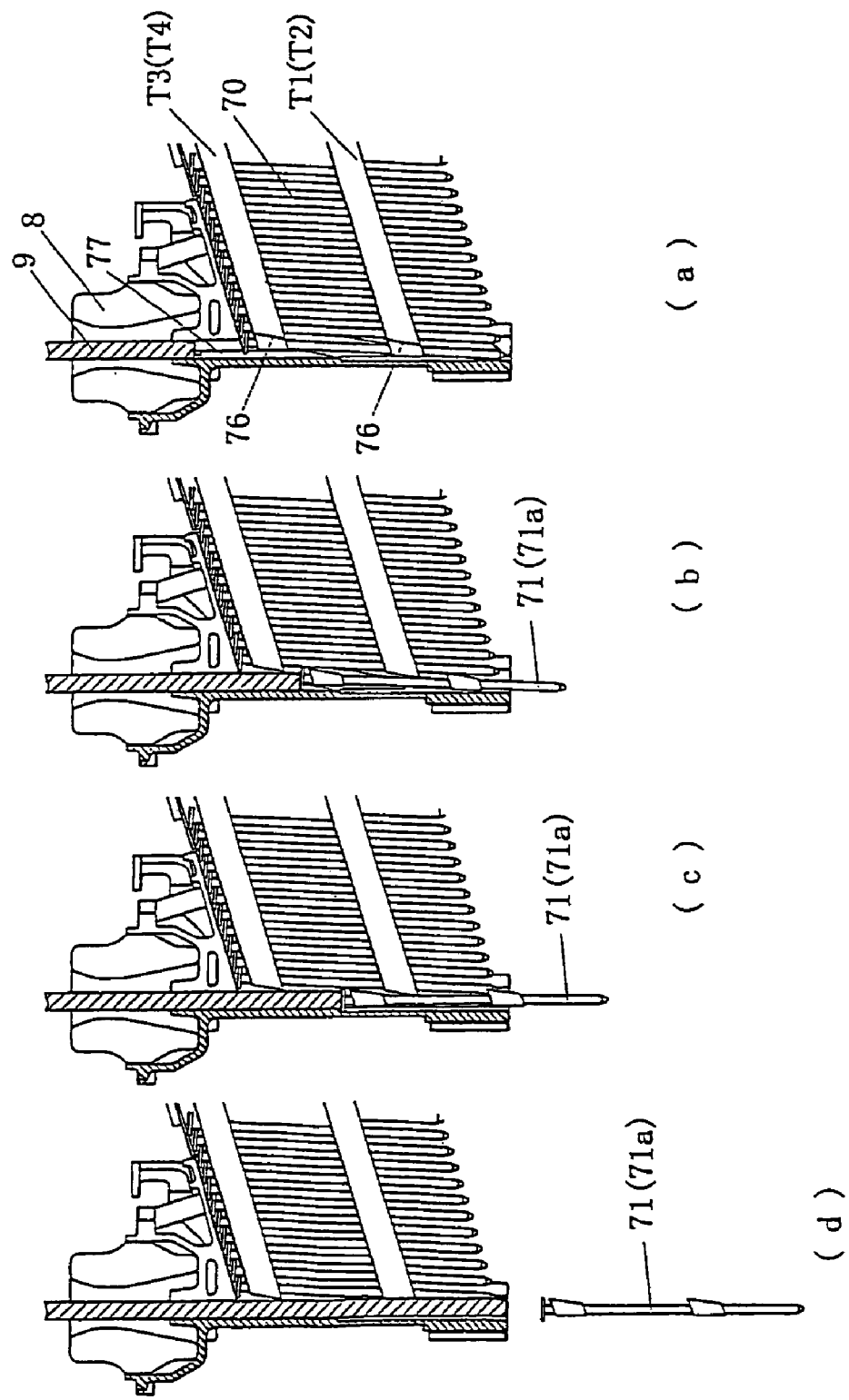
FIG. 13 is an explanatory diagram for explaining the state at the time of driving the connected fastener according to the ninth embodiment of the present invention.

FIG. 13 is a perspective view to schematically show the state of loading the connecting fastener 70 in the fastener driving machine 8 and ejecting the connecting fastener 71a by the driver 9 stepwise.

FIG. 13(a) is the state before operation of the driver 9, wherein the connecting fastener 70 is forced toward the front side (the left side in the figure) by the pressuring means (not shown) provided in the magazine. Moreover, in the case of the fastener driving machine 8 of this embodiment, the shank 72 is loaded in a state inclined by about 3 degrees with respect to the moving direction of the driver 9 to be operated in the ejection path 77 while the connecting fastener 70 is loaded normally. This is because the top end of the fastener is turned toward the rear side by the impact of the driver 9, and thus the angle is set preliminarily in consideration of the turning amount. At the time of the ejection, together with the angle, the angle of the vulnerable part functions reciprocally so as to have the posture of the fastener at the time of driving in an appropriate state.

FIG. 13(*b*) shows the state where the head part of the fastener 71 is hit by the driver 9 and the combination bands are sheared by the rupture of the vulnerable parts 76 in the combination bands T1, T2 and the combination bands T3, T4. At the time of the rupture of the vulnerable parts 76, the combination bands are separated along the angle of the vulnerable parts according to lowering of the fastener and then pushed forward so as to function as the reaction force with respect to the fastener 71 to be turned. Thereby, the fastener 71 is vertically driven into the work (FIG. 13(*c*)).

FIG. 13(*d*) shows the state after completely finishing the driving operation. One of the characteristics of the connecting fastener 71 according to this embodiment is that the shank of the fastener 71 with the fragments of the ruptured combination bands attached is driven into the work. The characteristic provides the extremely superior effects, and one of them is the absence of the litter. In the site where fasteners are actually used, several hundreds of the fasteners are used per day. If the combination bands are discharged as the litter each time of the fastener driving operation, the work site is extremely tainted. In the case of the connecting fastener 71 according to this embodiment, the effect of absence or the extremely small amount of the litter discharge can be provided. Moreover, if the shank 71 with the fragments of the ruptured combination bands attached is driven into the work, they serves as stoppers to prevent the driven nail to be removed so that they have an adverse effect for the fasteners to be removed from the work.

The vulnerable part 76 provided in the combination band will be further explained. As a result of the experiment, in the case the vulnerable part 76 is not provided, the fastener is ejected while being turned so that in some cases it is choked in the ejection path. Moreover, even in the case the vulnerable part 76 is provided with the angle in the same direction as the shank, the fastener turning cannot be prevented. As a result of the repeated experiments with the various conditions, the driving can be executed in the optimum state in the case the angle of the vulnerable part 76 has an inclination of about 3 degrees or more. However, the angle has the upper limit, and it is limited by the width W1, the interval with respect to the adjacent fasteners, and the pitch P2 of the above-mentioned vulnerable parts 76. The minimum requirement to be considered is to meet conditions where the vulnerable part to function effectively is necessarily provided between the fasteners as mentioned above. From this viewpoint, in the case of this embodiment, the angle of the upper limit is about 6 degrees.

Moreover, as the method for providing the vulnerable part to function effectively between the fasteners as mentioned above, there is a method of forming the vulnerable part between the fasteners after forming the connecting fastener. This requires inevitably the work of forming the perforations or the notches, however, the work process is increased and the base material is processed by the subsequent process so that the rigidity is insufficient and it can easily be bent as a result of the experiment.

Moreover, there is a method of preliminarily forming the combination band provided with the vulnerable part by the same pitch as the fastener arrangement pitch, and adhering the combination band with the fastener while positioning the vulnerable part to be disposed between the fasteners. In this case, the time is required for the positioning operation, and the defect products can easily be produced.

From this viewpoint, according to the present invention, based on the arrangement pitch P1 of the fasteners, or the like, the interval P2 and the angle are set such that the vulnerable parts are necessarily disposed between the fasteners regardless of the adhesion of the combination band.

As heretofore mentioned, the connecting fastener and the combination band according to the present invention are not limited to those having the above-mentioned various size values, or the like, and all the connecting fasteners and the combination bands having the various functions and various natures to be provided as explained above and having the gist of the present invention are included in the technological scope of the present invention.

According to the connecting fastener of the first aspect of the present invention as explained above, when the impact load is applied to the combination band at the time of driving the driver, even the lower side part of the fastener in the combination band can easily be cut off so that the inclination of the driving direction by having the driven fastener pulled by the combination band can be prevented at the time of driving the connecting fastener by the driver, and thus the driven fastener can proceed straightly. Moreover, since the fragments of the cut combination band cannot be scattered on the floor, or the like, taint or damage of the floor surface, or the like can be prevented. Furthermore, since the separation facilitating means can be formed preliminarily in the combination band, there is no need of the subsequent process of forming the perforations, or the like between the fastener and the fastener after supporting a plurality of fasteners in parallel on the combination band.

According to the connecting fastener of the second aspect of the present invention, since at least any of the notch, the perforations, the slit and the thin part is provided, the separation facilitating means can be formed preliminarily in the combination band or the material with the separation facilitating means formed can be used so that the production process of the connecting fastener can be simplified, and as a result, it is advantageous in terms of the cost reduction.

According to the connecting fastener of the third aspect of the present invention, in the case the combination band is adhered only in the upper part or the middle part, or the tip end part of the fastener, the combination band can be cut off further easily at the time of driving the fastener. Moreover, if the combination band is adhered at two or more portions, in the case the connecting fastener is formed like a plate and the plate-like connecting fasteners are piled up, the state where the fasteners of the upper combination bands are placed between the fastener and the fastener of the lower combination band so as to prevent movement of the combination bands can be avoided.

According to the connecting fastener of the fourth aspect of the present invention, since the combination bands are adhered on both the front and rear side surfaces of the arranged fasteners and the separation facilitating means is formed in the plastic layer for adhering the inner side fasteners of the combination bands, the piled up combination bands can slip with each other even in the case the plate-like combination bands are piled up.

According to the connecting fastener of the fifth aspect of the present invention, since the angle of the separation facilitating means is formed in a range of 3 to 6 degrees, the number of the fasteners to be connected by the combination band can be increased, and the combination band can easily be separated at the time of driving the driver.

According to the connecting fastener of the sixth aspect of the present invention, since the separation facilitating means between the front and rear fasteners is formed so as to be inclined obliquely and link the combination band lower end part of the front side fastener and the combination band upper end part of the rear side fastener, it can be separated easily.

According to the connecting fastener of the seventh to ninth aspect of the present invention, by providing the shank and adhering the shank to the combination band by the upper and lower two portions, the effect of providing the strength not to be bent at the time of handling and the rigidity of supporting the fasteners to be driven in the fastener driving machine can be provided. Moreover, since one vulnerable part to function effectively is necessarily provided between the fasteners, the effect of ejecting all the fasteners stably can be provided.

According to the combination bands of the tenth to twelfth aspect of the present invention, the effect of forming a flat plate-like connecting fastener having predetermined strength and rigidity by connecting a plurality of fasteners can be provided. Moreover, since the vulnerable part is provided in the resin layer as the adhesive layer, the process is easy, the vulnerable part can be formed according to the fasteners to be connected, and the effect of preliminarily setting the rupture strength and the rupture direction can be provided.

The connected fastener according to the present invention is used for the fastener driving machine, or the like used at the construction site, or the like, and it is in particular suited in the case of using a large amount of the fasteners at the construction site, or the like. Moreover, the combination band is used at the time of producing the connecting fastener.

The invention claimed is:

1. A connected fastener comprising a plurality of fasteners supported in parallel with an arrangement pitch by a combination band;
    wherein the combination band is made either of a paper or a resin having an adhesive layer;
        wherein the adhesive layer of the combination band is bonded to at least one surface of the fasteners at least at any of an upper part, a middle part or a lower part of the fasteners that are disposed in parallel;
        wherein the combination band is provided with a plurality of separation facilitators for facilitating separation of the fasteners, the separation facilitators extend from an upper part of a subsequent fastener toward a lower part of a preceding fastener, and the separation facilitators are formed with a distance between each pair of adjacent separation facilitators that is smaller than the arrangement pitch of the fasteners;
        wherein each of the separation facilitators is selected from the group consisting of:
        a slit formed in the adhesive layer;
        a thin part formed in the adhesive layer;
        perforations formed in the adhesive layer; or
        a v-shaped notch formed in an upper end rim part of the combination band and has a forward side extending coaxially with the fastener and a backward side having an inclination angle of 3 to 6 degrees with respect to an axial direction of the fastener.

2. The connected fastener according to claim 1, wherein the combination band includes a pair of bands that are bonded to both front and rear sides of the fasteners.

3. The connected fastener according to claim 1, wherein the separation facilitators have an inclination angle of 3 to 6 degrees with respect to an axial direction of the fastener.

4. The connected fastener according to claim 1, wherein the separation facilitators disposed between the preceding and subsequent fasteners in the combination band are formed with an inclination angle with respect to an axial direction of the fastener and the line linking an intersecting portion of the preceding fastener and a lower end part of the combination band with the intersection portion of the subsequent fastener and the upper end part of combination band, as a maximum inclination angle.

5. The connected fastener according to claim 1, wherein each of the separation facilitators is a slit formed in the adhesive layer.

6. The connected fastener according to claim 1, wherein each of the separation facilitators is a thin part formed in the adhesive layer.

7. The connected fastener according to claim 1, wherein each of the separation facilitators is perforations formed in the adhesive layer.

8. The connected fastener according to claim 1, wherein each of the separation facilitators is a vulnerable part formed as a linear thin part across an entirety of the width direction of the adhesive layer.

9. The connected fastener according to claim 1, wherein each of the separation facilitators is a vulnerable part formed as a linear thin part of the adhesive layer, at a position between the shafts of the fasteners disposed in parallel at equal intervals.

10. The connected fastener of claim 1, wherein the slit, thin part, or perforations are formed only in the adhesive layer.

11. The connected fastener according to claim 1, wherein the thin part is a vulnerable part formed as a linear thin part across an entirety of the width direction of the adhesive layer, the width direction extending substantially in the longitudinal direction of the fasteners.

12. The connected fastener according to claim 1, wherein the thin part is a vulnerable part formed as a linear thin part of the adhesive layer, at a position between the shafts of the fasteners disposed in parallel at equal intervals.

13. The connected fastener according to claim 1, wherein the thin part is a vulnerable part formed as a linear thin part across an entirety of the width direction, the width direction extending substantially in the longitudinal direction of the fasteners.

14. The connected fastener according to claim 1, wherein the thin part is a vulnerable part formed as a linear thin part, at a position between the shafts of the fasteners disposed in parallel at equal intervals, inclining at a direction from an upper part of a subsequent fastener toward a lower part of a preceding fastener.

15. A connected fastener comprising a plurality of fasteners each having a shaft of a predetermined length and a head part to be hit mounted on an upper end of the shaft, the fasteners are disposed in parallel at equal intervals and formed into a flat shape by connecting the shafts of the arranged fasteners with a combination band;
    wherein the combination band is a tape member made of a base member comprising a paper or a material which does not melt at a predetermined temperature, having a predetermined width and one surface provided with an adhesive layer having a predetermined width extending substantially in a longitudinal direction of the fasteners and a thickness, the adhesive layer functions as a bond at the predetermined temperature;

wherein the fasteners are bonded to the combination band at a predetermined position on a lower side of the shaft below a center of the shaft in the longitudinal direction, or the fasteners are bonded at both the predetermined position on the lower side and at a vicinity of the upper end part;

wherein the adhesive layer of the combination band is provided with at least a vulnerable part formed as a linear thin part, at a position between the shafts of the fasteners disposed in parallel at equal intervals, inclining at a direction from an upper part of a subsequent fastener toward a lower part of a preceding fastener, wherein in the thin parts the layer of adhesive is thinner than a thickness of the adhesive layer in remaining parts of the adhesive layer.

16. The connected fastener according to claim 15, wherein at least the combination band bonded at the predetermined position on the lower side below the center of the shaft in the longitudinal direction is provided on both the front and rear surfaces of the connected fastener formed in the flat shape.

17. The connected fastener of claim 15, wherein the vulnerable part is formed only in the adhesive layer.

18. A combination band for connecting a plurality of fasteners having a shaft of a predetermined length and a head to be hit mounted on the upper end of the shaft so that the plurality of fasteners form a flat shape, the combination band comprising:

a base material formed into a tape having a predetermined width extending substantially in the longitudinal direction of the fasteners and made of a paper or a flexible material which does not melt at a predetermined temperature;

wherein the base material is provided with an adhesive layer on one side having a bonding function at the predetermined temperature, wherein the adhesive layer has a predetermined width extending substantially in a longitudinal direction of the fasteners and a thickness;

wherein the adhesive layer is provided with a vulnerable part formed as a plurality of linear thin parts across an entirety of the width direction, wherein in the thin parts the layer of adhesive is thinner than a thickness of the adhesive layer in remaining parts of the adhesive layer.

19. The combination band according to claim 18, wherein the vulnerable part is provided with an inclination at a predetermined angle with respect to the width direction of the combination band.

20. The combination band according to any of claim 18 or 19, wherein the width is about 10 mm, and the thickness of the adhesive layer is about 0.3 mm.

21. A connected fastener comprising a plurality of fasteners supported in parallel with an arrangement pitch by a combination band;

wherein the combination band is made either of a paper or a resin having an adhesive layer;

wherein the adhesive layer of the combination band is bonded to at least one surface of the fasteners at least at any of an upper part, a middle part or a lower part of the fasteners that are disposed in parallel;

wherein the combination band is provided with a plurality of means for facilitating separation of the fasteners, the separation facilitating means extend from an upper part of a subsequent fastener toward a lower part of a preceding fastener, and the separation facilitators are formed with a distance between each pair of adjacent separation facilitating means that is smaller than the arrangement pitch of the fasteners.

22. The combination band of claim 21, wherein each of the separation facilitators is selected from the group consisting of:

a slit;

a thin part;

perforations; or a v-shaped notch formed in an upper end rim part of the combination band and has a forward side extending coaxially with the fastener and a rearward side having an inclination angle of 3 to 6 degrees with respect to an axial direction of the fastener.

23. The combination band according to claim 22, wherein each of the separation facilitators is a slit formed in the adhesive layer.

24. The combination band according to claim 22, wherein each of the separation facilitators is a thin part formed in the adhesive layer.

25. The combination band according to claim 22, wherein each of the separation facilitators is a v-shaped notch formed in an upper end rim part of the combination band and has a forward side extending coaxially with the fastener and a rearward side having an inclination angle of 3 to 6 degrees with respect to an axial direction of the fastener.

26. The combination band according to claim 22, wherein each of the separation facilitators is a vulnerable part formed as a linear thin part across an entirety of the width direction of the adhesive layer.

27. The combination band according to claim 22, wherein each of the separation facilitators is a vulnerable part formed as a linear thin part of the adhesive layer, at a position between the shafts of the fasteners disposed in parallel at equal intervals.

28. The connected fastener of claim 21, wherein the separation facilitators are formed only in the adhesive layer.

* * * * *